United States Patent [19]

Furukawa et al.

[11] 4,427,751

[45] Jan. 24, 1984

[54] ALKALINE BATTERY

[75] Inventors: Nobuhiro Furukawa, Hirakata; Kenji Inoue, Higashiosaka; Shuzo Murakami, Ibaraki, all of Japan

[73] Assignee: Sanyo Electric Co., Ltd., Osaka, Japan

[21] Appl. No.: 273,677

[22] Filed: Jun. 15, 1981

[30] Foreign Application Priority Data

Feb. 13, 1981 [JP] Japan .................... 56-20747

[51] Int. Cl.³ ............................................. H01M 6/04
[52] U.S. Cl. ..................................... 429/206; 429/229
[58] Field of Search ............................... 429/229–231, 429/222, 206

[56] References Cited

U.S. PATENT DOCUMENTS

| 2,987,567 | 6/1961 | Freas et al. | 429/229 |
| 3,198,668 | 8/1965 | Schneider | 429/229 X |
| 4,022,953 | 5/1977 | Charkey | 429/229 |
| 4,037,033 | 7/1977 | Takamura et al. | 429/229 X |
| 4,328,297 | 5/1982 | Bilhoen | 429/229 X |

Primary Examiner—Charles F. LeFevour
Attorney, Agent, or Firm—Hubbell, Cohen, Stiefel & Gross

[57] ABSTRACT

A zinc alkaline secondary battery possessed of an excellent cycle characteristic, having a negative electrode which comprises a base layer of zinc active material incorporating cadmium metal and/or a cadmium compound and an outer layer made up of cadmium metal and/or a cadmium compound and applied to the surface of the base layer of zinc active material.

9 Claims, 5 Drawing Figures

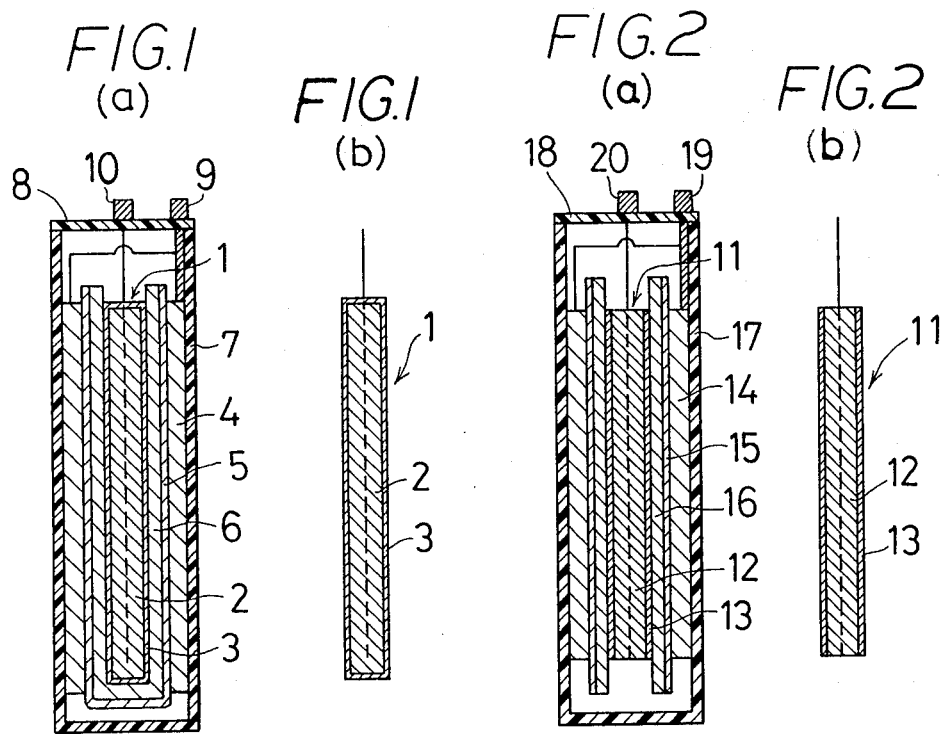
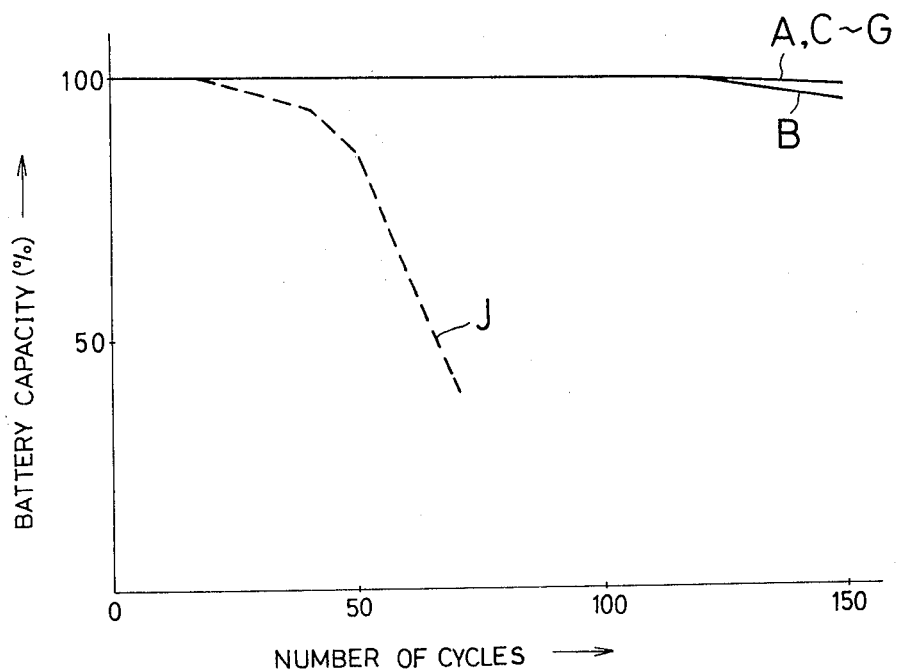

ALKALINE BATTERY

BACKGROUND OF THE INVENTION

1. Field of the Invention

This invention relates to a zinc alkaline secondary battery such as a nickel-zinc secondary battery or a silver-zinc secondary battery which operates with an alkaline electrolyte and uses zinc as a negative active material, and more particularly to a zinc alkaline secondary battery having an outer layer of cadmium metal and/or a cadmium compound formed on the outer side of the layer of the negative active material.

2. Description of the Prior Art

In recent years, the remarkable popularity of portable electronic and electric devices has come to accelerate rapid replacement of primary dry cells by secondary batteries, especially nickel-cadmium secondary batteries. As a more capable version of such secondary batteries, the zinc alkaline secondary battery has been drawing keen attention. This secondary battery enjoys the following advantages.

(1) Zinc, as a negative active material, possesses a high energy density for its weight and is available at a low cost.

(2) The operating voltage of this secondary battery is high and stable.

(3) The secondary battery exhibits good low-temperature properties.

(4) It operates safely without causing any environmental pollution.

This zinc alkaline secondary battery nevertheless has a disadvantage in that its service life, namely the charge-discharge cycle life, is short.

It is believed that this disadvantage is due to the formation of dendritic zinc or readily shedding mossy zinc on the surface of the negative electrode. With a view to eliminating this disadvantage, improvements have been made in electrolytes, current collectors, active material compositions, separators, structures of negative electrodes, etc.

Inventions relating to improvements on the structures of negative electrodes, among others, are described below.

For example, U.S. Pat. No. 4,022,953 discloses a negative electrode wherein the current collector thereof is coated with a first layer of cadmium metal and/or a cadmium compound and this first layer is further coated with a second layer formed of a zinc active material and cadmium metal and/or a cadmium compound.

Japanese Patent Publication No. 6690/1979 discloses a negative electrode wherein the central layer of a zinc active material has disposed on the outer side thereof a mixed layer formed of the hydroxide of an alkaline earth metal, particularly calcium hydroxide.

In the circumstance, the inventors have perfected a zinc alkaline secondary battery of a construction which is capable of inhibiting the zinc in the negative electrode from being dissolved out in the form of zincate ions, $[Zn(OH)_4]^{2-}$, into the electrolyte during the discharge of the secondary battery thus significantly extending the cycle life of the secondary battery. To be specific, the zinc alkaline secondary battery of this invention is characterized by the fact that the negative electrode thereof uses as its base a layer of a zinc active material incorporating therein cadmium metal and/or a cadmium compound and has formed on the surface thereof an outer layer made of cadmium metal and/or a cadmium compound. This invention, accordingly, is believed to provide a novel zinc alkaline secondary battery which differs from any of the various versions of prior art mentioned above in terms of object and construction.

SUMMARY OF THE INVENTION

It is an object of this invention to provide a zinc alkaline secondary battery which is possessed of a zinc negative electrode comprising a base layer of zinc active material incorporating therein cadmium metal and/or a cadmium compound and an outer layer of cadmium metal and/or a cadmium compound formed on the surface of the base layer, at least on the side directly opposed to the positive electrode of the secondary battery.

The zinc negative electrode of this invention is characterized by using cadmium metal and/or a cadmium compound in both the zinc active material layer and the outer layer. Consequently, the two layers enjoy high mutual adhesiveness and the presence of the outer layer serves to inhibit the otherwise possible formation of zincate ions from the zinc active material layer and consequently to improve the cycle of the secondary battery.

BRIEF DESCRIPTION OF THE DRAWINGS

FIG. 1(a) is a longitudinal section of a zinc alkaline secondary battery as one embodiment of the present invention and FIG. 1(b) is a longitudinal section of the zinc negative electrode of the zinc alkaline secondary battery.

FIG. 2(a) is a longitudinal section of a zinc alkaline secondary battery as another embodiment of this invention and FIG. 2(b) is a longitudinal section of the zinc negative electrode of the zinc alkaline secondary battery.

FIG. 3 is a graph showing the cycle characteristic of the various zinc alkaline secondary batteries according to this invention as compared with a conventional zinc alkaline secondary battery.

DETAILED DESCRIPTION OF THE PREFERRED EMBODIMENTS

The layer of zinc active material and the outer layer in the zinc alkaline secondary battery of this invention use cadmium metal and/or a cadmium compound. In these layers, there may be used either cadmium metal or a cadmium compound. Combined use of cadmium metal and a cadmium compound proves advantageous because it facilitates the initial charge of the secondary battery. Generally it is desirable to use these materials in a finely divided state. In terms of particle diameter, it is desired that the cadmium metal measure about 100 microns and the cadmium compound represented by, e.g., cadmium oxide measure about 10 microns. Desirably the zinc oxide and zinc which are used as the negative active material measure less than about 10 microns and about 50 microns, respectively.

To meet the purpose of this invention, the cadmium compound has only to fulfill the requirement that it should form cadmium metal on reduction ($Cd^{2+} + 2e \rightarrow Cd$). Examples of the cadmium compound which fulfill this requirement include cadmium oxide, cadmium hydroxide, cadmium, chloride, cadmium sulfate and cadmium acetate. Of these cadmium compounds, cadmium oxide and cadmium hydroxide are preferred examples.

The outer layer on the surface of the negative electrode of this invention is formed of a composition generally made up of cadmium metal and/or a cadmium compound and a small amount of a binder. The amount in which the binder is used in the composition generally is in the range of from 1 to 10% by weight.

When both cadmium metal and a cadmium compound are used in the outer layer, the ratio in which the two materials are used is desired to fall within the range of 1:9–9:1.

The content of cadmium metal and/or a cadmium compound in the layer of zinc active material generally is within the range of from 1 to 10% by weight.

As the zinc active material, zinc metal or zinc oxide which is generally used in ordinary zinc alkaline secondary batteries or a mixture thereof can be used.

As the positive electrode, a nickel electrode, a silver oxide electrode or an air electrode can be used. The secondary battery can be formed in any ordinary shape prevalent in the art such as, for example, a rectangular, cylindrical or button type shape.

As the binder for use in the formation of the negative electrode, it is desired to adopt a binder having excellent resistance to alkalis and to oxidation rather than the binders heretofore finding popular acceptance. These binders may be suitably selected from among those well known in the art. For Example, such fluorine resins as polytetrafluoroethylene (PTFE), tetrafluoroethylene-hexafluoropropylene copolymer(FEP) and the like may be useful and they may be used in the form of dispersion or powder. Aqueous solutions of carboxymethyl cellulose and polyvinyl alcohols may also be useful.

The negative electrode of this invention is manufactured by an ordinary method. A typical procedure involves thoroughly mixing the component materials selected to make up the layer of zinc active material, kneading the resultant mixture with water to give rise to a paste, applying this paste to a current collector formed of copper, iron or other suitable metallic substance and drying the applied coat to complete a layer of zinc active material. It further involves thoroughly mixing the component materials selected to make up the outer layer, kneading the resultant mixture with water to produce a paste, applying this paste to the surface of the aforementioned layer of zinc active material, pressing and drying this outer layer against the former layer and consequently producing the negative electrode. Alternatively, the formation of the negative electrode may be accomplished by having the finely divided cadmium metal and/or cadmium compound uniformly distributed on the aforementioned layer of zinc active material and thereafter pressing the deposited layer of particles against the former layer thereby giving rise to an outer layer adhering fast to the surface of the former layer.

Basically, the size of the layer of zinc active material in the negative electrode is similar to that of the positive electrode (such as a nickel electrode) to which the negative electrode is opposed. For reasons well known in the art, it is desired that the capacity of the layer of zinc active material be about 1.5 to 4 times that of the nickel electrode. The thickness of the layer of zinc active material, therefore, closely relates to the capacity of the nickel electrode. To be combined advantageously with a nickel electrode which has a high packing density or a large thickness, the layer of zinc active material is required to possess a sufficiently large thickness. Conversely when the nickel electrode to be used in combination has a low packing density or a small thickness, the layer of zinc active material is required to have a small thickness.

In due consideration of the construction of the secondary battery, it is proper for the thickness of the layer of zinc active material inclusive of the current collector to fall within the range of from 0.5 to 2.5 mm. In this case, the ratio of thickness between the outer layer and the layer of zinc active material is suitably selected within the range of from 1:6 to 1:10. When the layer of zinc active material is required to possess a large thickness, however, this ratio of thickness may deviate from the lower limit of 1:10 and fall in the range of from 1:15 to 1:20. When the layer of zinc active material conversely is required to possess a small thickness, the ratio of thickness of the outer layer may exceed the upper limit of 1:6 and fall in the range of from 1:3 to 1:4.

As the electrolyte for use in the secondary battery of the present invention, there can be used an aqueous solution of potassium hydroxide or sodium hydroxide. The concentration of the solute in the aqueous solution is desired to fall in the range of from 5 to 10 normals, preferably from 7 to 9 normals. The electrolyte further contains zinc oxide in an amount up to the level of saturation. Additional incorporation in the electrolyte of such a metal compound as lithium hydroxide [Li(OH)], indium hydroxide [In(OH)$_3$], trilead tetraoxide (Pb$_3$O$_4$), bismuth hydroxide [Bi(OH)$_3$], thallium oxide (Tl$_2$O$_3$), tellurium dioxide (TeO$_2$) or stannous chloride (SnCl$_2$) or such an organic compound such as a quaternary amine, gelatine or peptone has the effect of inhibiting production of dendritic zinc with added efficiency.

The separator to be used in the secondary battery of the present invention may be of any type adopted ordinarily in the art. Examples of the separator include non-woven fabric, knit fabric and woven fabric made of synthetic fibers and natural fibers, and filter paper. They are used either in a single layer or in a combination of two or more layers piled one on top of another.

The zinc alkaline secondary battery of this invention has either a structure which, as illustrated in FIG. 1, comprises a negative electrode (1) formed by coating the entire surface of a layer of zinc active material (2) with an outer layer (3) of the foregoing description, a positive electrode (4) and separators (5) and (6) impregnated with an electrolyte and interposed between the negative electrode and the positive electrode (plus a battery case (7), a battery case cover (8) and terminals (9) and (10) for the positive and negative electrodes respectively) or a structure which, as illustrated in FIG. 2, comprises a negative electrode (11) formed by coating with an outer layer (13) only the surface of a layer of zinc active material (12) which is opposed to the positive electrode (14) and separators (15) and (16) impregnated with an electrolyte and interposed between the negative electrode and the positive electrode (plus a battery case (17), a battery case cover (18), and terminals (19) and (20) for the positive and negative electrodes respectively). In the former structure, the electrolyte may be present in a free state as well as in a state impregnating the separators and the electrodes. In the latter structure the electrolyte contained should be limited to the extent of impregnating only the separators and electrodes and should not be present in a free state.

As is evident from the foregoing description, the layer of zinc active material in the secondary battery of this invention is tightly covered with the outer layer formed of cadmium metal and/or a cadmium compound so that it may not expose itself to direct contact with the separators containing the electrolyte. Owing to this special structure, the production of zincate ions from the layer of zinc active material due to the reaction of electric discharge is decreased notably. Consequently, the formation of dendritic or mossy zinc during the charging of the secondary battery is proportionately decreased. Further, in a conventional secondary battery where the zinc active material layer is directly contacted with a separator containing electrolyte, the repetition of charge and discharge cycles causes that zinc dissolve into the electrolyte contained in the separator by forming the zincate ion. This provides a lowering of the concentration of zinc at the surface of the zinc active material layer and causes a difference in zinc concentration between the surface part and internal part of the negative electrode. Thus, at the surface part, the concentration of the binder increases, and the electrical conductivity and electrolyte retention decrease. Consequently, the electrochemical reaction in the internal part of the negative electrode becomes difficult, and this results in the lowering of the battery capacity.

In the negative electrode of the secondary battery of this invention, the zinc active material layer is not directly contacted with the electrolyte contained in the separators, so that the decrease of the zinc concentration in the zinc active material layer is inhibited. Consequently, the electrical conductivity and electrolyte retention at the negative electrode surface are maintained at a high level and the lowering of the battery capacity is inhibited. All these favorable factors contribute to improve the cycle characteristic of the secondary battery.

Further, it can be said as well that in this invention, the adhesiveness exhibited between the outer layer formed of cadmium metal and/or a cadmium compound and the layer of zinc active material is stably retained because of the materials used in these layers. Specifically, the strong adhesion between the two layers is retained stably because the cadmium metal and/or cadmium compound incorporated in the layer of zinc active material forms an intermetallic combination with the outer layer through the metal of cadmium. This effect of the outer layer is retained for a long time.

The zinc alkaline secondary battery of this invention possesses a negative electrode notably different in structure from the secondary battery of the aforementioned prior invention, U.S. Pat. No. 4,002,953. The layer of cadmium metal and/or a cadmium compound of the negative electrode in the secondary battery of this invention has the effect of inhibiting the formation of zincate ions from the negative electrode. On the other hand, the corresponding layer of the above prior art has the effect of causing zinc produced in the course of charging to be electrically deposited uniformly on the surface of a negative electrode instead of inhibiting the formation of zincate ions in the course of the discharge. This invention, therefore, has totally different operation and effect from this prior art.

The zinc alkaline secondary battery of this invention and that of the aforementioned prior invention, Japanese Patent Publication No. 6690/1979, have the common effect of inhibiting the occurrence of zincate ions in the electrolyte. Nevertheless the present invention enjoys the following points of excellence:

(1) In the secondary battery of the present invention, since the inner and outer layers of the negative electrode both contain cadmium metal and/or a cadmium compound, the two layers are held in fast adhesion.

(2) In the prior invention, when calcium hydroxide, for example, is used in the outer layer of the negative electrode, the cell voltage is lowered because this substance makes the negative electrode an insulator. This deficiency does not occur in the secondary battery of the present invention because the cadmium compound incorporated in the outer layer of the secondary battery is converted into cadmium metal through the charging reaction before the zinc in the layer is permitted to undergo the charging reaction.

(3) In the secondary battery of this invention, since the outer layer is formed of a tightly packed mass of cadmium particles, the amount of the electrolyte retained in the outer layer itself is small, the amount of zinc dissolved in the form of zincate ions is small and the extent to which the layer of zinc active material is deformed is also small. By contrast, in the secondary battery of the prior invention, it is believed that the outer layer of the negative electrode serves only to seize zincate ions. In consequence of the dissolution of zinc, there occurs a vacant space between the zinc layer and the calcium hydroxide layer of the outer layer. The vacant space lowers the adhesiveness of the two adjoining layers and, at the same time, gives rise to a layer of free electrolyte, which lends itself to the formation of zincate ions.

As described in detail above, the zinc alkaline secondary battery of the present invention has a very long cycle life, and thus has a very high industrial value. It is a highly useful power source for electronic calculators, radio sets, television sets, tape recorders, powerful lights, electronic flashes, electric shavers, video tape recorders, 8-mm motion picture cameras, etc.

The present invention will now be described below with reference to working examples, which are not intended to limit this invention in any sense.

EXAMPLE 1

Zinc oxide powder (of a particle size of below $10\mu$), 80% by weight, 10% by weight of zinc powder (of a particle size of about $50\mu$), 5% by weight of cadmium oxide powder (of a particle size of below $10\mu$) were mixed. To the mixture was added 5% by weight of PTFE dispersion (Teflon 60 manufactured by du Pont, solid content 60% by the weight). The resultant mixture was kneaded with water added thereto to form a paste. The paste was applied to a current collector (0.1 mm in thickness) made of copper, and the applied paste was dried to produce a layer of zinc active layer 1.1 mm in thickness. Then, 80% by weight of the same cadmium oxide powder as mentioned above, 18% by weight of the same cadmium metal powder as mentioned above were mixed. To the mixture was added 2% by weight of the same PTFE dispersion as mentioned above. The resultant mixture was kneaded with water added thereto to form a paste. This paste was applied to the surface of the aforementioned layer of zinc active material. The applied paste was dried and subsequently pressed all together to produce an outer layer of 0.07 mm in thickness, completing a negative electrode. A cellophane sheet 0.035 mm in thickness was wound in two plies on the negative layer. A non-woven fabric of nylon fibers (0.22 mm in thickness) was wound in one ply on the cellophane layer. These layers functioned as separators. An aqueous 9 N potassium hydroxide solution containing zinc oxide powder in a concentration of 1 M was used as the electrolyte. A sintered nickel electrode (1.0 mm in thickness) of the type generally used in ordinary nickel-cadmium secondary batteries was adopted as the positive electrode. In this manner, a zinc alkaline secondary battery (A) of the structure as illustrated in FIG. 1 was manufactured.

EXAMPLE 2

A zinc alkaline secondary battery (B) was manufactured by following the procedure of Example 1, except that a zinc negative electrode was obtained by preparing a mixture consisting of 80% by weight of the same cadmium oxide powder as used in Example 1 and 20% by weight of the same cadmium metal powder as used in Example 1, uniformly distributing the resultant mixture on the surface of the same layer of zinc active material and pressing the mixture all together.

EXAMPLES 3, 4, 5, 6 and 7

Zinc alkaline secondary batteries (C), (D), (E), (F) and (G) were manufactured by following the procedure of Example 1, except that the varying additives indicated respectively below were added to the electrolyte of Example 1.

| Additive to electrolyte | Example No. | Symbol of battery |
|---|---|---|
| Indium hydroxide in concentration of $10^{31}$ $^3$M | 3 | (C) |
| Tellurium dioxide in concentration of 0.3 g/lit. | 4 | (D) |
| Stannous chloride in concentration of 0.2 g/lit. | 5 | (E) |
| Thallium oxide in concentration of 0.4 g/lit. | 6 | (F) |
| Mixture of the four compounds indicated above | 7 | (G) |

EXAMPLE 8

A zinc alkaline secondary battery (H) was manufactured by following the procedure of Example 1, except that the composition used for the outer layer of the negative electrode was made up of 80% by weight of cadmium metal, 18% by weight of cadmium acetate and 2% by weight of PTFE dispersion.

EXAMPLE 9

A zinc alkaline secondary battery (I) was manufactured by following the procedure of Example 1, except that the composition used for the outer layer of the negative electrode was made up of 80% by weight of cadmium metal, 18% by weight of cadmium chloride and 2% by weight of PTFE dispersion.

COMPARATIVE EXPERIMENT

A zinc alkaline secondary battery (J) was manufactured by following the procedure of Example 1, except that a negative electrode formed solely of the same layer of zinc active material as involved in Example 1 was used in the place of the negative electrode of Example 1.

Under charge-discharge conditions which involved charging at 150 mA for six hours and discharging at 150 mA for a varying period required for the battery voltage to reach 1.3 V, the zinc alkaline secondary batteries A–G and J were tested for cycle characteristic. The results are as shown in FIG. 3. The results clearly show that the zinc alkaline secondary batteries conforming to the present invention possess outstanding cycle characteristics compared with the secondary battery of the comparative experiment.

What is claimed is:

1. A zinc alkaline secondary battery having a zinc negative electrode, a positive electrode, and an electrolyte, said zinc negative electrode comprising a base layer of zinc active material incorporating therein a cadmium substance selected from the group consisting of cadmium metal, a cadmium compound and mixtures thereof, and an outer layer made from a cadmium substance selected from the group consisting of cadmium metal, a cadmium compound and mixtures thereof, said outer cadmium layer applied to the surfaces of said zinc active base layer which are opposite to said positive electrode, whereby said outer cadmium layer is interposed between said base layer of zinc active material and said positive electrode.

2. A secondary battery as claimed in claim 1, wherein the cadmium compound is selected from the group consisting of cadmium oxide, cadmium hydroxide, cadmium chloride, cadmium sulfate and cadmium acetate.

3. A secondary battery as claimed in claim 1, wherein said outer cadmium layer includes, a binder.

4. A secondary battery as claimed in claim 3, wherein the weight ratio of cadmium metal to cadmium compound in said outer layer falls within the range of from 1:9 to 9:1.

5. A secondary battery as claimed in claim 1, wherein said zinc active material contains 1 to 10% by weight of the cadmium substance.

6. A secondary battery as claimed in claim 1, wherein the electrolyte is an aqueous solution of 5 to 10 N potassium hydroxide or sodium hydroxide.

7. A secondary battery as claimed in claim 6, wherein the electrolyte contains a compound selected from the group consisting of lithium hydroxide, indium hydroxide, lead oxide, bismuth hydroxide, thallium oxide, tellurium dioxide and stannous oxide.

8. A secondary battery as claimed in any one of claims 1–7, wherein a separator impregnated with the electrolyte is interposed in an intimately adjoining state between the negative electrode having the entire surface thereof covered with the outer cadmium layer and the positive electrode.

9. A secondary battery as claimed in any one of claims 1–7, wherein a separator impregnated with the electrolyte is interposed in an intimately adjoining state between the negative electrode having only the surfaces opposed to the positive electrode thereof covered with the outer cadmium layer and the positive electrode.

* * * * *